(12) United States Patent
Figenschou

(10) Patent No.: US 9,127,793 B2
(45) Date of Patent: *Sep. 8, 2015

(54) POWER UMBILICAL COMPRISING SEPARATE LOAD CARRYING ELEMENTS OF COMPOSITE MATERIAL

(75) Inventor: Arild Figenschou, Billingstad (NO)

(73) Assignee: Aker Kvaerner Subsea AS, Lysaker (NO)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,644

(22) Filed: May 3, 2012

(65) Prior Publication Data

US 2012/0263539 A1 Oct. 18, 2012

Related U.S. Application Data

(63) Continuation of application No. 11/597,871, filed as application No. PCT/NO2005/000215 on Jun. 17, 2005, now Pat. No. 8,186,911.

(30) Foreign Application Priority Data

Jun. 18, 2004 (NO) .................................. 20042557
Oct. 28, 2004 (NO) .................................. 20044671

(51) Int. Cl.
*F16L 11/22* (2006.01)
*F16L 11/127* (2006.01)
*H01B 7/04* (2006.01)

(52) U.S. Cl.
CPC ............... *F16L 11/22* (2013.01); *F16L 11/127* (2013.01); *H01B 7/045* (2013.01)

(58) Field of Classification Search
CPC ............................... F16L 11/22; F16L 11/127
See application file for complete search history.

(56) References Cited

U.S. PATENT DOCUMENTS

| | | | |
|---|---|---|---|
| 4,196,307 A | 4/1980 | Moore et al. | |
| 4,462,717 A | 7/1984 | Falcimaigne | |
| 4,569,392 A | 2/1986 | Peterman | |
| 5,813,106 A | 9/1998 | Haug et al. | |
| 6,046,404 A * | 4/2000 | Figenschou et al. | 174/47 |
| 6,239,363 B1 * | 5/2001 | Wooters | 174/47 |
| 6,472,614 B1 | 10/2002 | Dupont et al. | |
| 6,612,370 B1 * | 9/2003 | Jahnsen et al. | 166/367 |
| 6,940,054 B1 * | 9/2005 | Heggdal | 219/629 |
| 7,754,966 B2 * | 7/2010 | Figenschou | 174/47 |
| 8,186,911 B2 * | 5/2012 | Figenschou | 405/169 |
| 2005/0061538 A1 | 3/2005 | Blucher | |

FOREIGN PATENT DOCUMENTS

| | | |
|---|---|---|
| GB | 1 203 355 A | 8/1970 |
| GB | 2 258 940 A | 2/1993 |

(Continued)

*Primary Examiner* — John Kreck
(74) *Attorney, Agent, or Firm* — Birch, Stewart, Kolasch & Birch, LLP

(57) ABSTRACT

A power umbilical for transfer of large amounts of electric power, fluids and electric current/signals from the sea surface to equipment deployed on the sea bed, in particular in deep waters includes a number of electric power conducting cables, pipes and electric conductors/wires collected in a bundle, a filler material lying at least partly around and between the pipes, cables and the conductors/wires, and a protective sheath enclosing the pipes, cables conductors/wires and filler material. The load carrying elements of the power umbilical are light weighted rods of composite material that can either be collected in bundles or appear individually or in a combination thereof.

17 Claims, 7 Drawing Sheets

(56) References Cited

FOREIGN PATENT DOCUMENTS

| GB | 2 326 177 A | 12/1998 |
| GB | 2 326 758 A | 12/1998 |
| WO | WO 93/17176 A1 | 9/1993 |
| WO | WO 02/57560 A1 | 7/2002 |

* cited by examiner

POWER UMBILICAL COMPRISING SEPARATE LOAD CARRYING ELEMENTS OF COMPOSITE MATERIAL

CROSS-REFERENCE TO RELATED APPLICATIONS

This application is a Continuation of co-pending U.S. application Ser. No. 11/597,871, filed Jan. 30, 2007 now U.S. Pat. No. 8,186,911 which was filed as PCT/NO2005/000215 on Jun. 17, 2005, and which claims priority to Applications Nos. 2004 2557 and 2004 4671, filed in Norway on Jun. 18, 2004 and Oct. 28, 2004, respectively. The entirety of each of the above-identified applications is incorporated herein by reference.

BACKGROUND OF THE INVENTION

1. Field of the Invention

The present invention relates to a power umbilical for transfer of large quantities of electric power, fluids and electric current/signals from the sea surface to equipment located on the sea bed, in particular in deep waters, comprising a number of power conducting cables, pipes and electric conductors/wires collected in a bundle, a filler material arranged at least partly around and between the pipes, cables and conductors/wires, and a protective sheath enclosing the pipes, cables, conductors/wires and the filler material.

2. Background of the Invention

Recently, it has been more common to locate production equipment for oil and gas wells on the sea bed. Electric power is required to operate the production equipment. This requires not only electric conductors to control operations, but also heavy cables for transmission of electric power to electrical equipment, such as huge booster stations conveying recovered oil and/or gas.

Such heavy cables, normally manufactured of copper wire, are now integrated into the more traditional umbilical, which in turn is under continuous development and alters its construction and functions according to actual needs. These heavy electric cables have substantial transversal cross sections and provide the umbilical with considerable added weight due to the weight of copper. Because copper has a very poor load carrying capacity, the water depth at which the traditional umbilical can be used is very limited.

The traditional umbilicals are constructed as a composite structure which is able to transfer hydraulic liquids, chemicals, fluids, electric and optical signals and electric power between equipment on the sea bed and on the sea surface. An early version of such umbilicals is disclosed in WO 93/17176. Typically, most of the load transfer took place in a centrally located steel pipe of substantial dimension. Further examples of prior art are disclosed in GB 2 326 177 A and GB 2 326 758 A, all having the same assignee as the present invention.

It is to be understood that in the present description and patent claims, a clear distinction is made between electric cables, i.e. heavy and having a large transversal cross sectional area, and electric conductors and wires, i.e. thin and having a small cross sectional area. Each electric cable is able to transmit large quantities of electrical power, while the electric conductors or wires are used to transmit small quantities of current and control signals.

Instantly it appears that steel rope could be used as load carrying elements. This, however, does not completely solve the problem. Steel rope also adds substantial weight and, in combination with the heavy copper cables, the cables can not reach large depths before the power umbilical achieves yield stresses and are torn off due to its own weight.

SUMMARY OF THE INVENTION

Substantial efforts and resources have been expended in order to find a solution on how to transmit large quantities of electric power down to the sea bed at real large sea depths, such as 1500 meters and more.

This is now solved by combining a technology that is developed by the assignee of the present invention, the technology that is used for tension legs of floating platforms, such as disclosed in WO 02/057560 A1.

Thus, according to the present invention a power umbilical is provided, which is distinguished in that the power umbilical comprises separate load carrying elements. The load carrying elements are light weighted rods of composite material. The light weight rods of composite material may preferably be carbon rods having embedded strength fibers. The rods can either be collected in bundles or appear individually or a combination thereof.

Composite material has approximately the same load carrying capacity as steel, at the same time the weight is reduced to about 10% of that of steel. Thus, the load carrying elements do not contribute substantially to the total weight of the power umbilical which thereby provides an option to use the power umbilical in deep waters.

Rods of composite materials could also be used in the traditional umbilical, even if the instant invention was conceived with regard to a umbilical that should be in the form of a power umbilical designed to transmit substantial quantities of electric power. This is disclosed in simultaneously filed International patent application no. PCT/NO05/00216.

In one embodiment the filler material, the pipes, the cables and the conductors/wires can be laid in a helix or spiral configuration about the longitudinal axis of the power umbilical.

In a second embodiment the filler material, the pipes, the cables and the conductors/wires can be laid in a substantially rectilinear configuration without any twisting or spiraling.

The load carrying elements of the power umbilical can be collected in a twisted or spiraling bundle that is centrally located as a core element within the power umbilical.

As an alternative the load carrying elements of the power umbilical can be distributed in a number of bundles located peripheral relative to the longitudinal axis of the umbilical.

As an alternative the power umbilical can also include weight elements in order to add mass/weight to the umbilical, either over its entire extent or in some sections. Weight elements will be used in those instances where the umbilical has a tendency to become buoyant, such as in shallow waters.

The filler material, the pipes, the cables and the conductors/wires can be laid in several layers viewed in a radial direction.

In some embodiments the power cables can be collected in groups.

In one embodiment, the load carrying elements can consist of single rods that are distributed within the transversal cross section, and some may possibly be located adjacent to each other without being collected in a bundle.

Even if not strictly necessary, the filler material can be in the form of elongated channel elements that are able to at least partly enclose the respective pipes, cables and electric conductors/wires in order to keep these in position relative to each other.

BRIEF DESCRIPTION OF THE INVENTION

Other and further objects, features and advantages will appear from the following description of preferred embodi- FIG. 1 shows a transversal cross section through a first embodiment of a power umbilical according to the invention having load carrying elements centrally located;

DETAILED DESCRIPTION OF THE INVENTION

It is to be understood that it is possible to have two variants of the transversal cross section of the umbilicals shown in FIGS. 1-14, which do not appear from the figures, namely one where the individual elements of the umbilical are lying with a certain laying length about the longitudinal axis of the umbilical, and one variant where the individual elements are lying more or less in a straight line substantially parallel to the longitudinal axis of the umbilical. For the detailed construction of a traditional umbilical and how it can be manufactured reference is given to the previously mentioned publication WO 93/17176.

Figure 1:
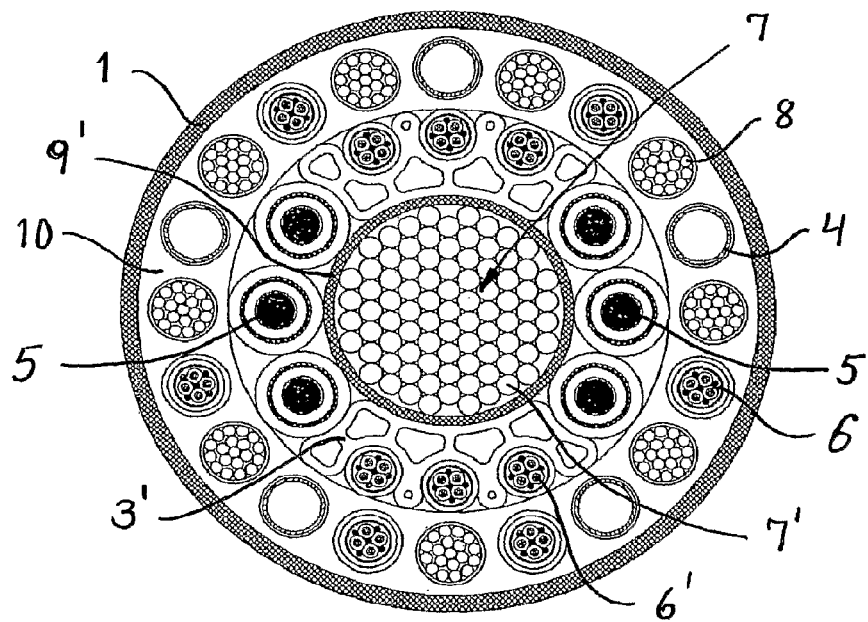
Figure 2:
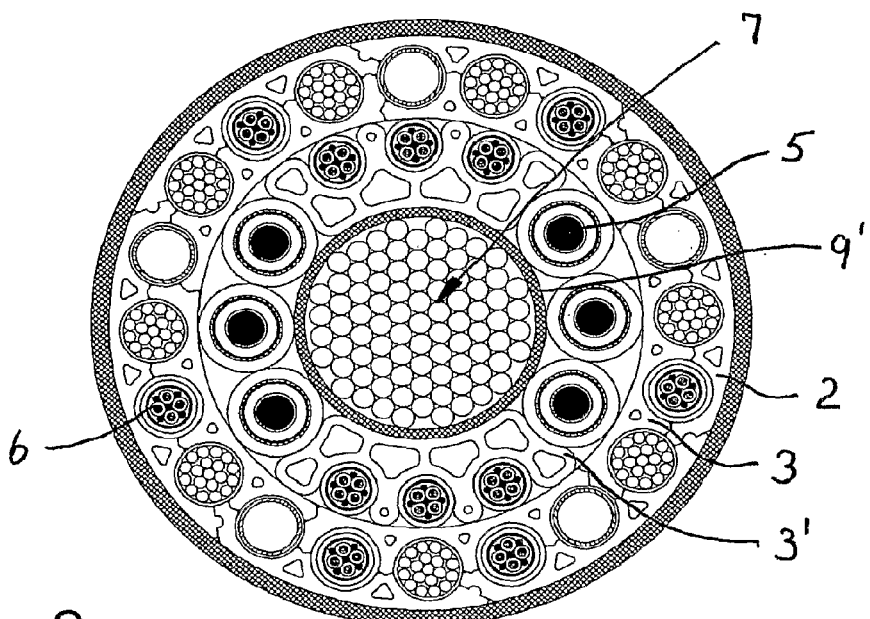
FIG. 2 shows a transversal cross section through a second embodiment of the power umbilical according to the invention.
Figure 3:
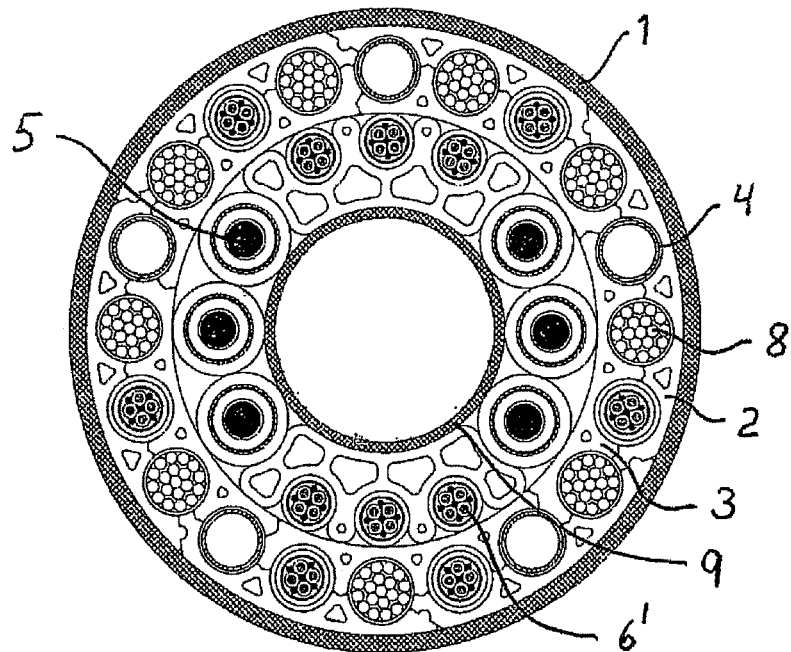
FIG. 3 shows a transversal cross section through another embodiment of the power umbilical according to the invention having several load carrying elements peripherally located.
Figure 4:
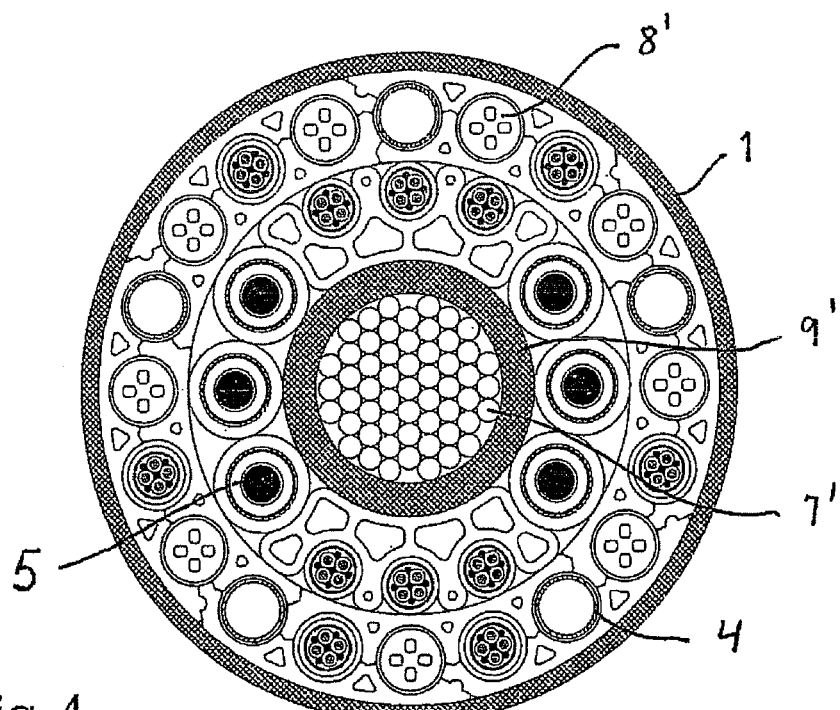
FIG. 4 shows a transversal cross section through another embodiment of the power umbilical according to the invention having the load carrying element centrally located.
Figure 5:
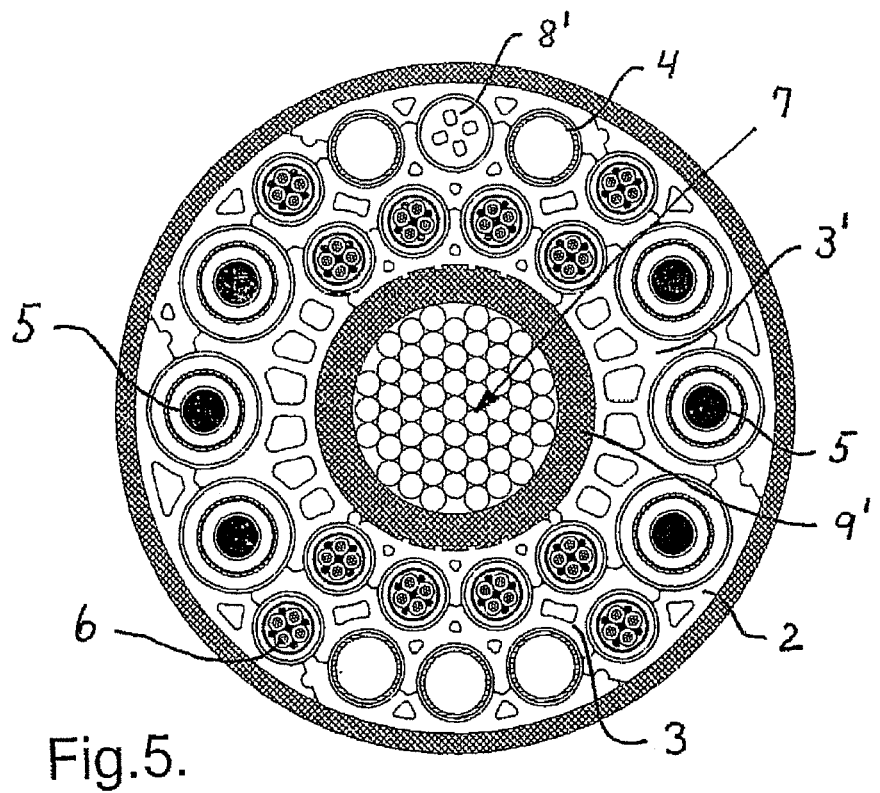
FIG. 5 shows a transversal cross section through still another embodiment of the power umbilical according to the invention having the load carrying element centrally located.

The power umbilical according to FIG. 1 is basically constructed of the following elements: load carrying element 7 having a bundle of rods 7' of composite material, electric power cables 5 of substantial transversal cross section, inner channel elements 3', for example of polyvinylchloride (PVC), electric conductors/wires 6, 6', fluid pipes 4 normally made of steel, weight elements 8, or further strength elements 8, for example in the form of steel rope, and an outer sheath 1, for example of polyethylene (PE). The reference number 9' can denote a friction material, like a rubber sheath, lying around the load carrying element 7. The reference number 9 can denote a pipe having a larger diameter than the fluid pipes 4 as illustrated in FIG. 3. The reference number 10 represents a filler substance different from the channel elements 3' and can be a foam substance or similar material. In one embodiment, the rods 7' are carbon rods having embedded strength fibers. The diameter of such rods is in order of magnitude of 6 mm without such dimension interpreted as any limitation.

The power umbilical according to FIG. 2-6 is basically constructed of the following elements: load carrying element 7 having a bundle of rods 7' of composite material, electric power cables 5 of substantial transversal cross section, inner channel elements 3', intermediate channel elements 3, outer channel elements 2, electric conductors/wires 6, 6', fluid pipes 4 normally made of steel, weight elements 8, or further strength elements 8, for example in the form of steel rope, and an outer sheath 1. The reference number 9' can denote a friction material, like a rubber sheath, lying around the load carrying element 7.

Figure 6:
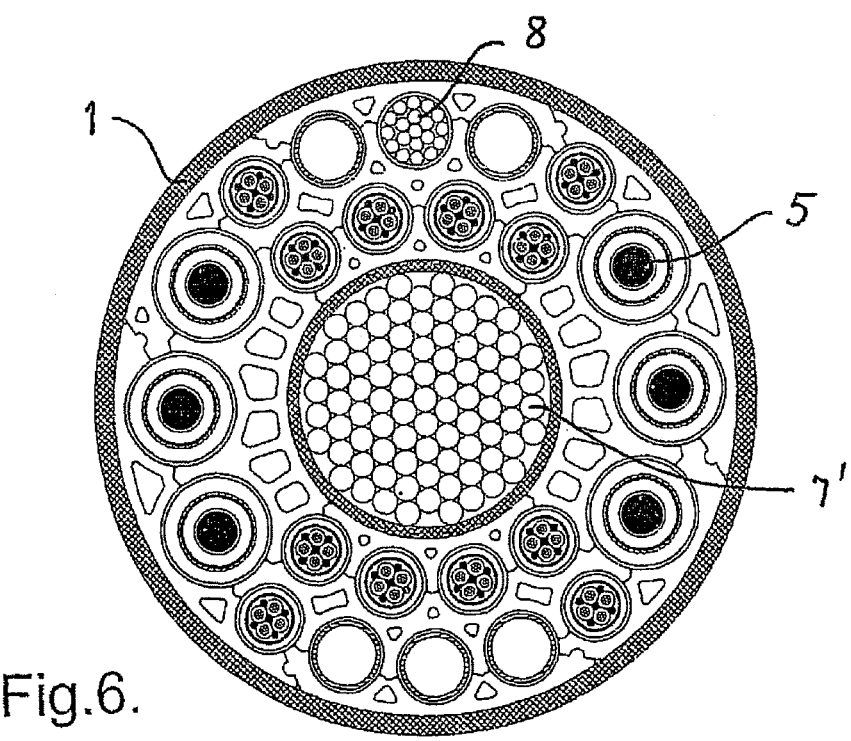
FIG. 6 shows a transversal cross section through still another embodiment of the power umbilical according to the invention having the load carrying element centrally located.

These elements are repeatedly found in most of the figures and are denoted with the same reference number in the respective figures. However, it is to be noted that FIGS. 4 and 5 omit the weight elements/strength elements 8 which are replaced with PVC profiles 8'. FIG. 6 shows one single weight element 8.

Figure 7:
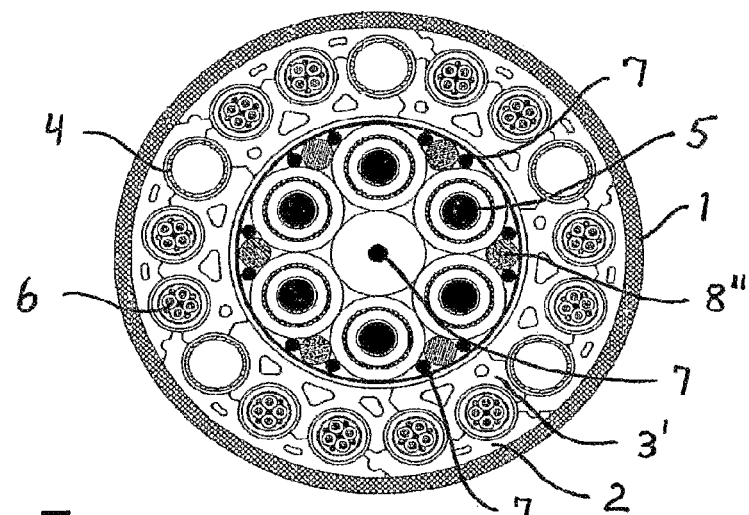
FIG. 7 shows a transversal cross section through still another embodiment of the power umbilical according to the invention where the load carrying elements consist of a number of single rods not being collected in a bundle.

FIG. 7 shows in particular a variant having a smaller cross sectional area, but with the power cables 5 collected centrally about one single load carrying element 7 and a number of load carrying elements 7 in the form of single rods distributed about the power cables 5. In between the single rods weight elements 8 can be placed, typically rods 8'' made of lead. Further, it has channel elements 2, 3 and an outer sheath 1. This provides a compact power umbilical requiring less space.

Figure 8:
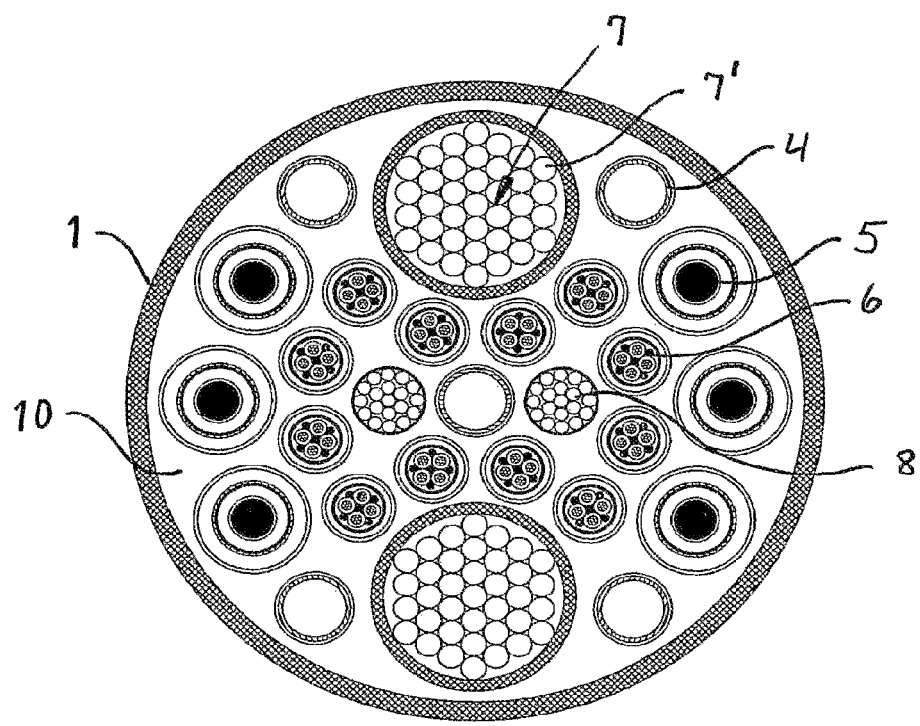
FIG. 8 shows a transversal cross section through a variant of the power umbilical according to the invention without the characteristic elongated channel elements.

FIG. 8 shows another variant of the power umbilical where channel elements are not used, but a filler substance 10 such as a foam substance. Otherwise, it has the same elements as above described, though differently located in the cross section.

Figure 9:
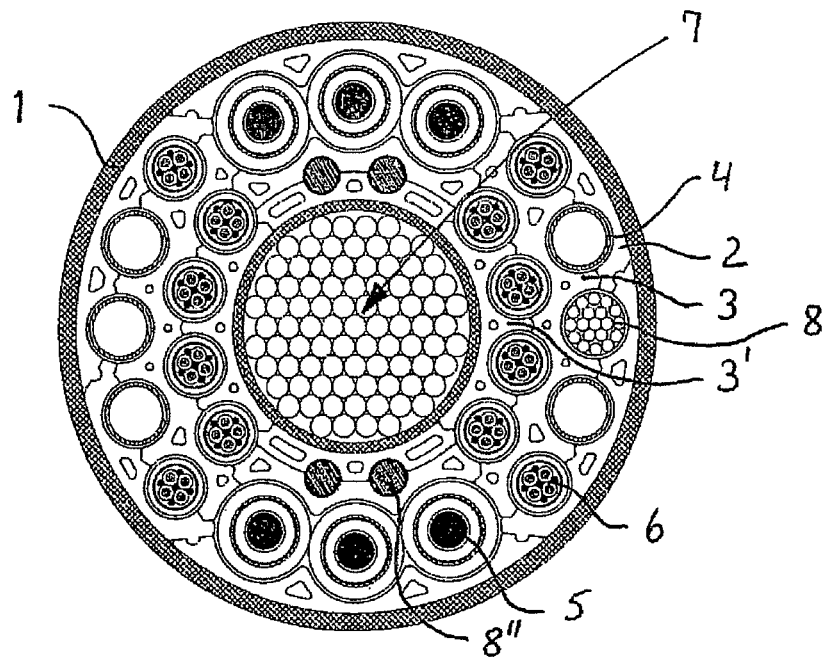
FIG. 9-14 show examples of different variants of the transversal cross section of the power umbilical.
Figure 10:
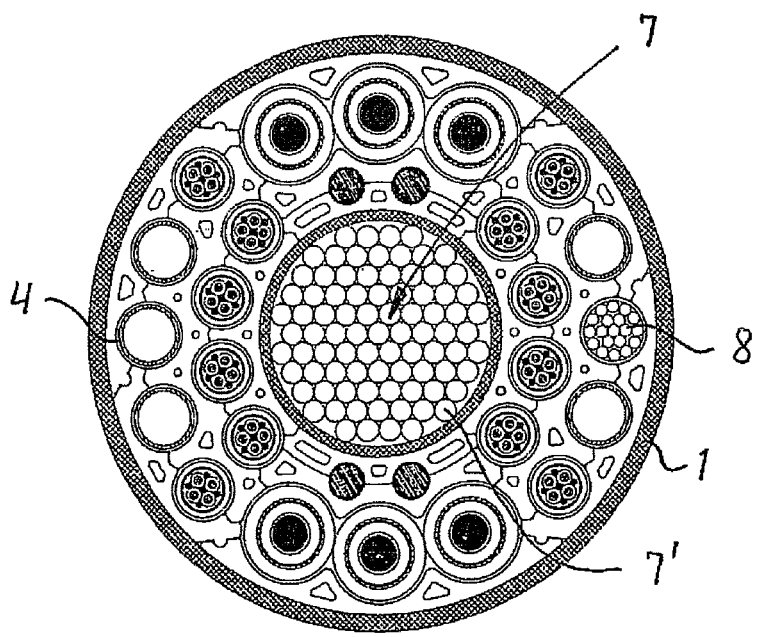
Figure 11:
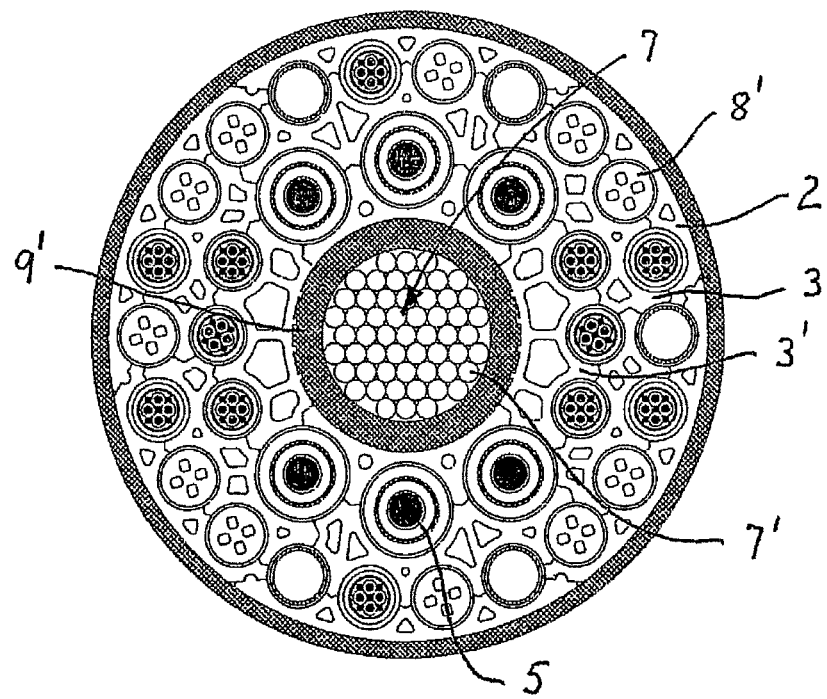
Figure 12:
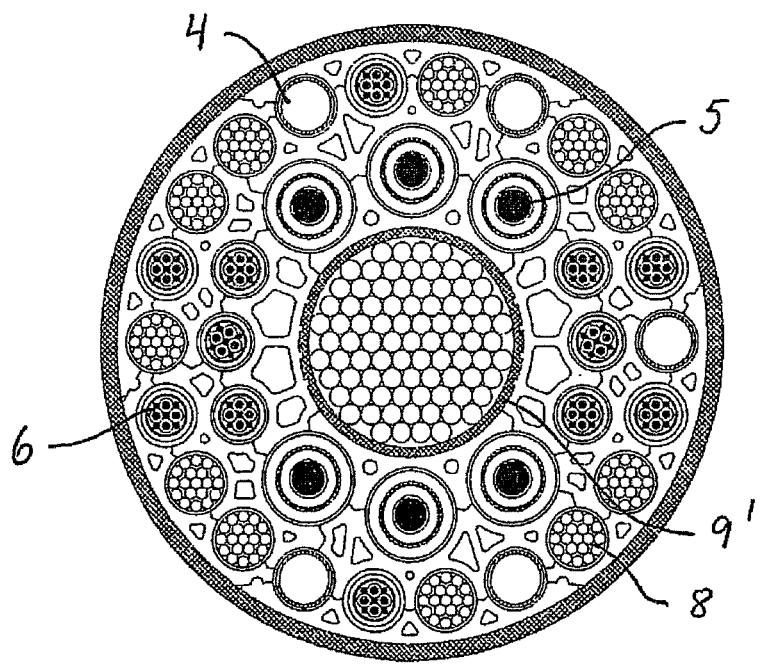
Figure 13:
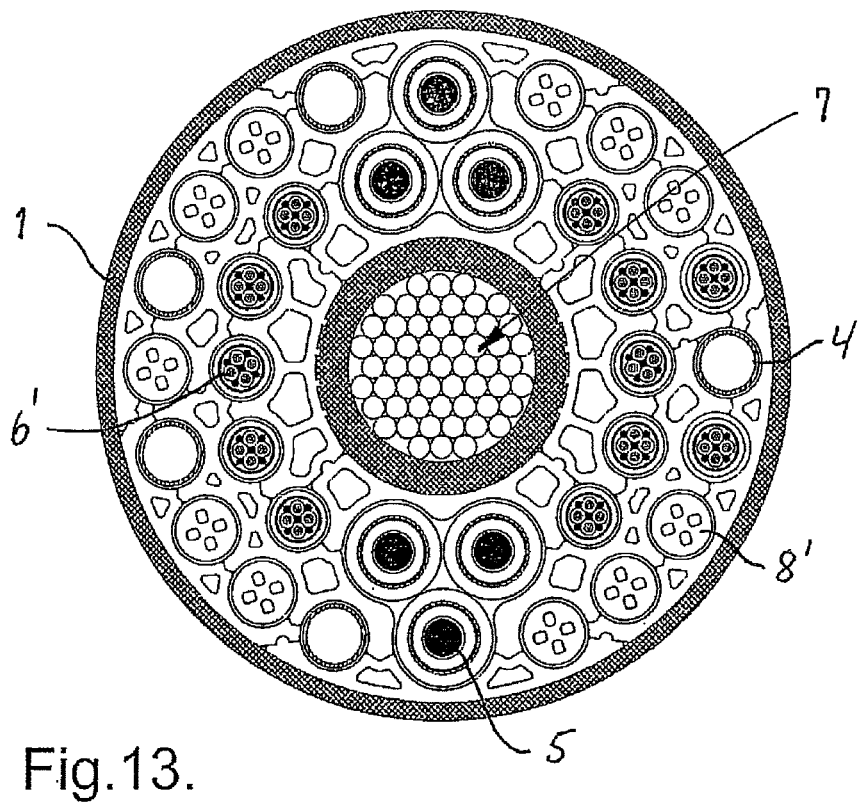
Figure 14:
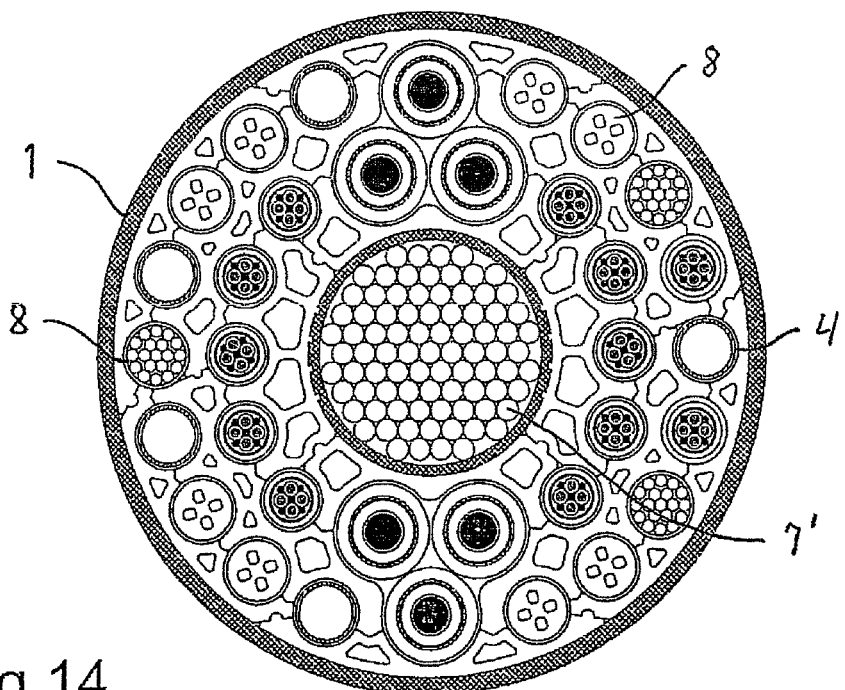

FIGS. 9-14 show further variants of the power umbilical according to the invention. FIGS. 9 and 10 show in particular inserted weight elements 8 in the form of lead rods 8'''.

What is claimed is:

1. A power umbilical for transmission of large quantities of electric power, fluids and electric current signals from the sea surface to equipment arranged on the sea bed, said power umbilical being adapted for use at depths where power umbilicals having metal load carrying elements and electric power cables of substantial transversal cross section, fluid pipes, and ropes which can create yield stresses that cause the metal load carrying elements to be torn off, said power umbilical comprising:
   a plurality of electric power conducting cables of substantial transversal cross section to supply high voltage electrical power;
   pipes to supply fluid; and
   electric conductors/wires supplying small quantities of electric current or control signals; and
   a filler material arranged at least partly around and between the pipes, cables and the conductors/wires, and a protective sheath enclosing the pipes, cables conductors/wires and filler material,
   wherein the power umbilical comprises separate load carrying elements, said load carrying elements being light weight carbon rods of composite material having embedded strength fibers.

2. The power umbilical according to claim 1, wherein the filler material, the pipes, the cables and the conductors/wires are laid in a helix configuration about the longitudinal axis of the power umbilical.

3. The power umbilical according to claim 1, wherein the filler material, the pipes, the cables and the conductors/wires are laid in a substantially rectilinear configuration without substantial twisting or spiraling.

4. The power umbilical according to claim 1, wherein the load carrying elements of the power umbilical are collected in a bundle located centrally as a core element within the power umbilical.

5. The power umbilical according to claim 1, wherein the load carrying elements of the power umbilical are distributed in a plurality of bundles located peripherally relative to the longitudinal axis of the umbilical.

6. The power umbilical according to claim 1, wherein the power umbilical includes weight elements in order to add mass/weight to the power umbilical.

7. The power umbilical according to claim 1, wherein the filler material, the pipes, the cables and the conductors/wires are laid in several layers viewed in a radial direction.

8. The power umbilical according to claim 1, wherein the power cables are collected in groups within the protective sheath.

9. The power umbilical according to claim 1, wherein the load carrying elements are individual rods distributed within the protective sheath.

10. The power umbilical according to claim 1, wherein the filler material is in the form of elongated channel elements which are able to at least partly enclose the respective pipes, cables and electric conductors/wires in order to keep these in position relative to each other.

11. The power umbilical according to claim 2, wherein the load carrying elements of the power umbilical are collected in a bundle located centrally as a core element within the power umbilical.

12. The power umbilical according to claim 3, wherein the load carrying elements of the power umbilical are collected in a bundle located centrally as a core element within the power umbilical.

13. The power umbilical according to claim 2, wherein the load carrying elements of the power umbilical are distributed in a plurality of bundles located peripherally relative to the longitudinal axis of the umbilical.

14. The power umbilical according to claim 3, wherein the load carrying elements of the power umbilical are distributed in a plurality of bundles located peripherally relative to the longitudinal axis of the umbilical.

15. The power umbilical according to claim 1, wherein the power cables are collected in groups within the protective sheath, and wherein the load carrying elements are individual rods distributed within the protective sheath.

16. The power umbilical according to claim 6, wherein the separate load carrying elements are spaced apart from the weight elements by the electrical power cable or electric conductor wires.

17. A power umbilical for transmission of large quantities of electric power, fluids and electric current signals from the sea surface to equipment arranged on the sea bed, said power umbilical being adapted for use at depths where power umbilicals having metal load carrying elements and electric power cables of substantial transversal cross section, fluid pipes, and ropes which can create yield stresses that cause the metal load carrying elements to be torn off, said power umbilical comprising:

a plurality of electric power conducting cables of substantial transversal cross section to supply high voltage electrical power;

pipes to supply fluid; and electric conductors/wires supplying small quantities of electric current or control signals;

a filler material arranged at least partly around and between the pipes, cables and the conductors/wires, and a protective sheath enclosing the pipes, cables conductors/wires and filler material; and a plurality of weight elements configured to add mass/weight to the power umbilical, wherein the power umbilical comprises separate load carrying elements, said load carrying elements being light weight carbon rods of composite material having embedded strength fibers, and wherein the separate load carrying elements are in the form of separated individual elements distributed around the power cables, and adjacent ones of the separate load carrying elements are spaced apart from each other by one of the plurality of weight elements.

\* \* \* \* \*